(12) United States Patent
Nakamura et al.

(10) Patent No.: US 8,491,144 B2
(45) Date of Patent: Jul. 23, 2013

(54) LIGHT EMITTING DEVICE AND DISPLAY DEVICE USING THE SAME

(75) Inventors: Tomoharu Nakamura, Tokyo (JP); Shingo Ohkawa, Saitama (JP); Satoru Murata, Kanagawa (JP)

(73) Assignee: Sony Corporation (JP)

( * ) Notice: Subject to any disclaimer, the term of this patent is extended or adjusted under 35 U.S.C. 154(b) by 302 days.

(21) Appl. No.: 13/065,530

(22) Filed: Mar. 24, 2011

(65) Prior Publication Data

US 2011/0242794 A1   Oct. 6, 2011

(30) Foreign Application Priority Data

Mar. 31, 2010   (JP) .............................. P2010-083266

(51) Int. Cl.
*G02F 1/1347*   (2006.01)
(52) U.S. Cl.
USPC .......... 362/97.3; 362/97.1; 362/606; 362/615; 349/62; 349/64
(58) Field of Classification Search
USPC ....... 362/234–248, 217.02–217.04, 218–225, 362/217.01, 97.1–97.4, 551–561, 296.01, 362/258–293, 297–310, 311.01–311.12, 362/326–355, 600–628; 349/64
See application file for complete search history.

(56) References Cited

U.S. PATENT DOCUMENTS

| | | | |
|---|---|---|---|
| 7,422,357 B1 * | 9/2008 | Chang | 362/602 |
| 7,588,364 B2 | 9/2009 | Kitamura et al. | |
| 7,810,949 B2 * | 10/2010 | Chang | 362/246 |
| 2007/0247871 A1 | 10/2007 | Yoo | |

FOREIGN PATENT DOCUMENTS

| | | |
|---|---|---|
| JP | 2007-293339 A | 11/2007 |
| JP | 2008-108623 A | 5/2008 |

* cited by examiner

*Primary Examiner* — Anh Mai
*Assistant Examiner* — Fatima Farokhrooz
(74) *Attorney, Agent, or Firm* — Lerner, David, Littenberg, Krumholz & Mentlik, LLP

(57) ABSTRACT

A light emitting device includes: a light guide unit; a light source; a light control member having a light incidence face on a back face, a light outgoing face on a surface and a light dispersion structure, and disposed so as to cover the gap on the neighboring two light guide plates; and a diffusion member disposed above the light guide unit and the light control member. The light dispersion structure includes a plurality of grooves extending in a direction along the side end face of the light guide plate and having curved wall faces, and emits leakage light from the gap in outgoing light of the light emitting element to a region wider than a region opposed to the gap, in the diffusion member.

12 Claims, 13 Drawing Sheets

LIGHT EMITTING DEVICE AND DISPLAY DEVICE USING THE SAME

CROSS-REFERENCE TO RELATED APPLICATION

The present application claims priority from Japanese Patent Application No. JP 2010-083266 filed in the Japanese Patent Office on Mar. 31, 2010, the entire content of which is incorporated herein by reference.

BACKGROUND OF THE INVENTION

1. Field of the Invention

The present invention relates to a light emitting device performing surface emission by using a plurality of light guide plates and to a display device having the light emitting device.

2. Description of the Related Art

Generally, a liquid crystal display (LCD) used in various electronic devices such as a television, a cellular phone, a notebook-sized PC (Personal Computer), and a digital camera has a back light which illuminates a liquid crystal panel. As the back light, for example, a light source module in which a light emitting diode (LED) is provided on a side face of a light guide plate is often used. An LED having an LED chip which emits white light and is mounted on a package made of heat-resistant polymer, ceramic, or the like is often used.

A light emitting device realizing increase in the screen size and adapted to a so-called partial driving method by disposing a plurality of such light source modules is proposed (see, for example, Japanese Unexamined Patent Application Publication Nos. 2008-108623 and 2007-293339).

SUMMARY OF THE INVENTION

In a light source module using the LED, surface emission is performed by making white light emitted from the LED to the inside of the light guide plates and extracting the white light from one face (light emission face) of the light guide plate. There is, however, a case such that a part of light emitted from the LED chip is leaked from a gap between the light guide plates and emitted directly above the LED without entering the light guide plates. When such leak light occurs, luminance increases locally around the border of the light guide plates, and uniform surface emission is not obtained.

In a liquid crystal display for use in mobile devices such as a cellular phone, the screen size is small, so that the light source module is often used alone. Consequently, the LED is disposed on the outside (rim) of the display screen, and leak light from the LED is blocked by the rim. Therefore, in the case of using the light guide plate alone, the influence of the leak light is not an issue.

However, in a display having the configuration in which a plurality of light source modules are disposed as in the Japanese Unexamined Patent Application Publication Nos. 2008-108623 and 2007-293339, the LED is disposed near the border of the light guide plates. That is, the LED is disposed in a local region in the display screen. Consequently, a light emitting device using a plurality of light guide plates has disadvantage such that non-uniformity in luminance occurs around the border of the light guide plates.

It is therefore desirable to provide a light emitting device performing surface emission by using a plurality of light guide plates and realizing uniformity in a luminance distribution and a display device using the light emitting device.

A light emitting device of an embodiment of the present invention has the following elements (A) to (E):

(A) a light guide unit in which a plurality of light guide plates each having a light outgoing face on a surface and a light incidence face on a side end face are disposed on the same face so as to have gaps between the side end faces;

(B) a light source in which one or more light emitting elements which emit light toward the light incidence face of the light guide plate is/are disposed in each of the gaps;

(C) a light control member having a light incidence face on a back face, a light outgoing face on a surface and a light dispersion structure, and disposed so as to cover the gap on the neighboring two light guide plates (D) a diffusion member disposed above the light guide unit and the light control member; and (E) the light dispersion structure includes a plurality of grooves extending in a direction along the side end face of the light guide plate and having curved wall faces, and emits leakage light from the gap in outgoing light of the light emitting element to a region wider than a region opposed to the gap, in the diffusion member.

A display device according to an embodiment of the invention includes the above-described light emitting device according to an embodiment of the invention, and a display panel displaying an image by modulating light from the light emitting device.

In the light emitting device and the display device according to the embodiment of the present invention, light emitted from the light emitting element and entering the light guide plate propagates by repetitive reflection in the light guide plate and is taken as illumination light from the top face (light outgoing face) of the light guide plate, thereby performing surface emission. On the other hand, light leaked from the gap (leakage light) without entering the light guide plate is emitted to a region wider than a region opposed to the gap, in the diffusion member by the light control member having the light dispersion structure. The leakage light is dispersed, and non-uniformity in luminance around the border of the neighboring light guide plates is suppressed.

Preferably, the light emitting device and the display device according to the embodiment of the invention have the following modes in order to effectively display the operation.

[1] The grooves in the light control member are formed in the light incidence face, and a wall face tilt angle $\theta 2$ of the groove satisfies formulae (1) and (2)

where an angle formed between light emitted from the light emitting element and leaked directly from the gap and a normal line to the side end face of the light guide plate is set as $\theta 1$, a maximum value of the angle formed by the light emitted from the light emitting element and leaked directly from the gap and the normal line to the side end face of the light guide plate is set as $\theta 1 max$, a minimum value of the angle formed by the light emitted from the light emitting element and leaked directly from the gap and the normal line to the side end face of the light guide plate is set as $\theta 1 min$, a maximum tilt angle of the curved wall face of the groove (a tilt of an inclined face on the side opposite to the light travel direction is set to a positive value) is set as $\theta 2 max$, a minimum tilt angle of the curved wall face of the groove (a tilt of an inclined face in the light travel direction is set to a negative value) is set as $\theta 2 min$, refractive index of the light control member is set as $n1$, width of the gap is set as $L1$, and a gap between the light guide plate and the diffusion member is set as L2.

$$\theta 2max > \tan^{-1}\{\cos\theta 1max/(\sin\theta 1max - n1)\} \quad (1)$$

$$\theta 2min < \tan^{-1}\{(\sin\alpha - \cos\alpha 1min/n1)/(\cos\alpha - \sin\alpha 1min/n1)\} \quad (2)$$

$$\alpha = \sin^{-1}[-\sin\{\tan^{-1}(L1/L2)\}/n1]$$

[2] Width L4 of the light control member satisfies formula (3)
where width of a gap between the light guide plates is L1, distance between the light guide plate and the diffusion plate is L2, and an irradiation range of the light control member is L3.

$$L3 > L4 > L1 \quad (3)$$

$$L3 = L2 \cdot \tan\{\sin^{-1}(n1 \cdot \sin\theta a)\} - L2 \cdot \tan\{\sin^{-1}(n1 \cdot \sin\theta b)\}$$

$$\theta a = -\theta 2min - \sin^{-1}\{\cos(\theta 2min + \theta 1min)/n1\}$$

$$\theta b = -\theta 2max - \sin^{-1}\{\cos(\theta 2max + \theta 1max)/n1\}$$

Width L5 of a part in the light control member, which overlies the light guide plate satisfies formula (4) where refractive index of the light guide plate is set as n2, thickness is set as L6, distance between the light emitting element and the light incidence face of the light guide plate is set as L7, and distance between center of the light emitting element and a bottom face of the light guide plate is set as L8.

$$L5 < L6/\tan[\sin^{-1}[\sin\{\tan^{-1}(L8/L7)\}/n2]] \quad (4)$$

In the light emitting device of the embodiment of the present invention, the light control member having the light dispersion structure is disposed on the gap between the light guide plates, so that light leaked from the gap is emitted to a region wider than a region opposed to the gap, in the diffusion member. Therefore, surface emission is performed by using the plurality of light guide plates and uniformity of luminance of illumination light is realized. With the configuration, the display device according to the embodiment of the invention displays an image having stably high quality.

Other and further objects, features and advantages of the invention will appear more fully from the following description.

DETAILED DESCRIPTION OF THE PREFERRED EMBODIMENTS

Embodiments of the present invention will be described in detail below with reference to the drawings. The description will be given in the following order.

1. Summary of display device using a light emitting device as a back light
2. Details of the light emitting device
3. Comparison with comparative examples Configuration of Display Device 1

Figure 1:
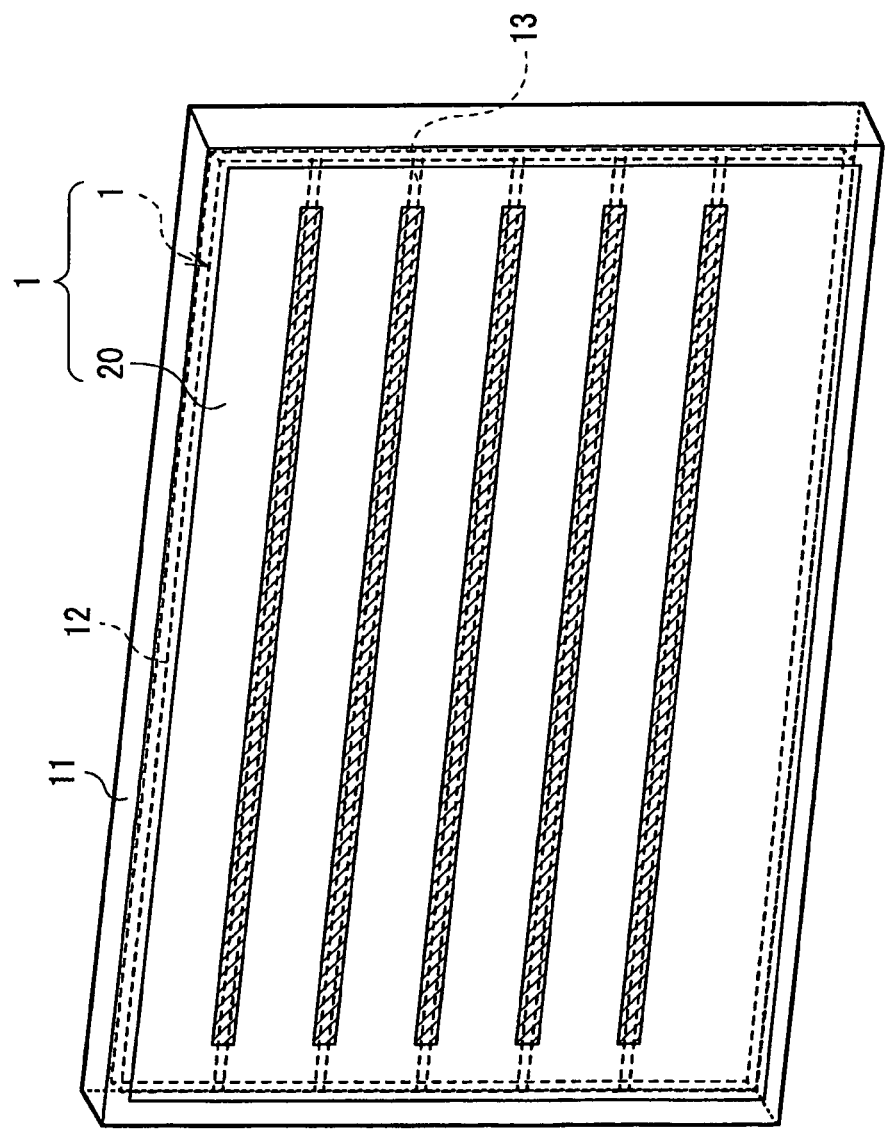
FIG. 1 is a perspective view illustrating a schematic configuration of a display device according to an embodiment of the present invention.

FIG. 1 illustrates a schematic configuration of a display device 1 according to an embodiment of the present invention. The display device 1 is, for example, a liquid crystal display and has a display panel (liquid crystal panel) 20 in the front face of a light emitting device (back light) 10. The display panel 20 is configured by sealing a liquid crystal of, for example, the VA (Vertical Alignment) mode, a TN (Twisted Nematic) mode, an IPS (In-Plane Switching) mode, or the like between a pair of substrates.

Configuration of Light Emitting Device 10

Figure 2:
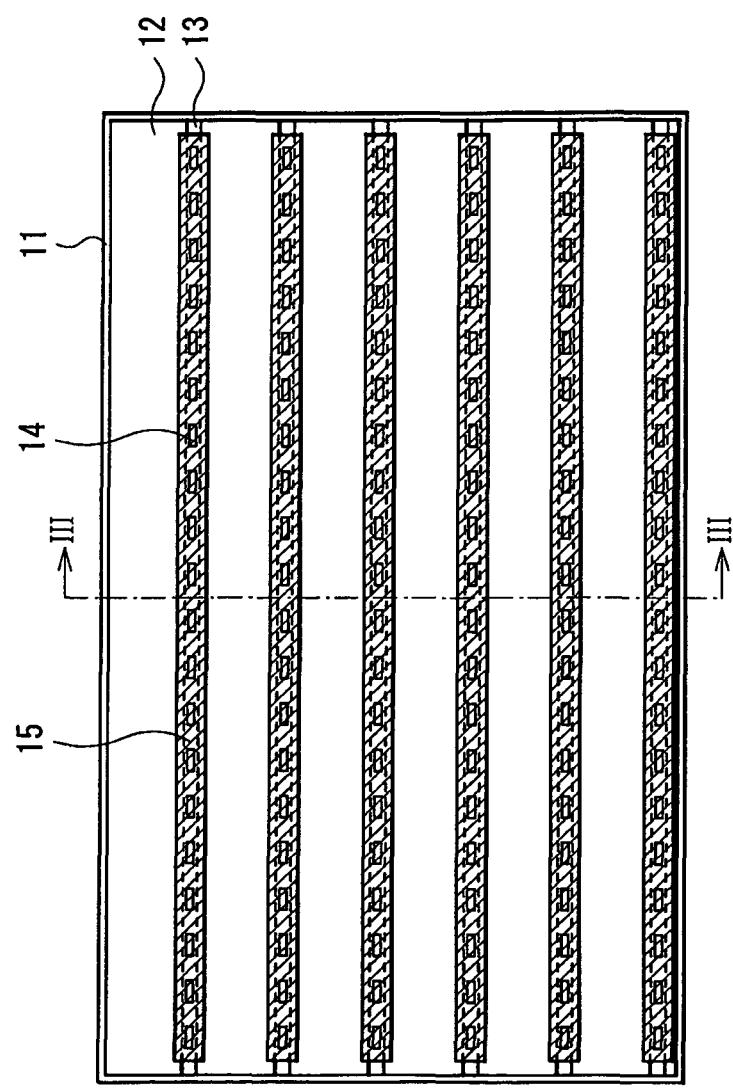
FIG. 2 is a plan view of a light emitting device used for the display device in FIG. 1.
Figure 3:
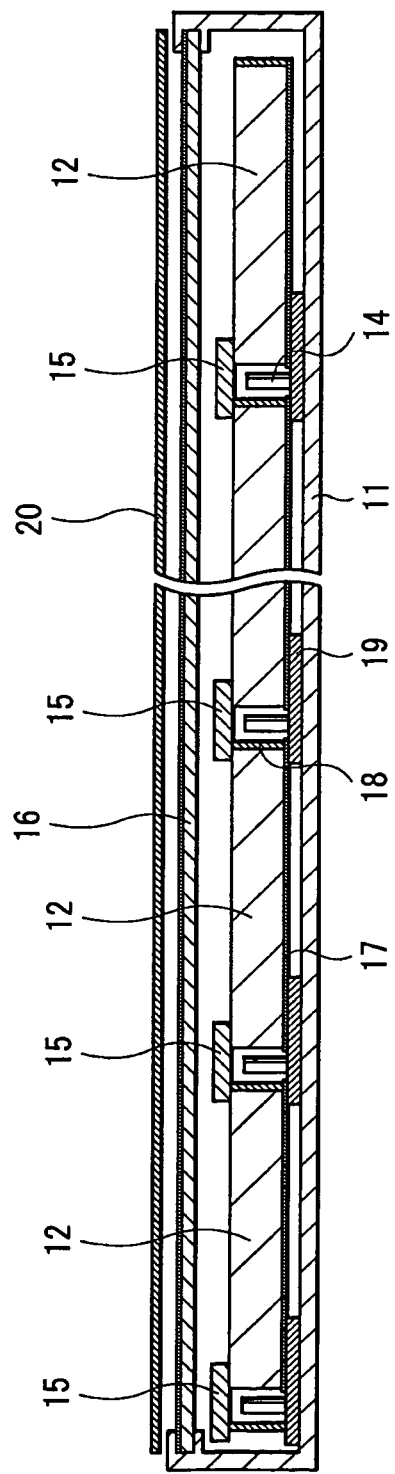
FIG. 3 is a cross section taken along line III-III in FIG. 2.
Figure 4:
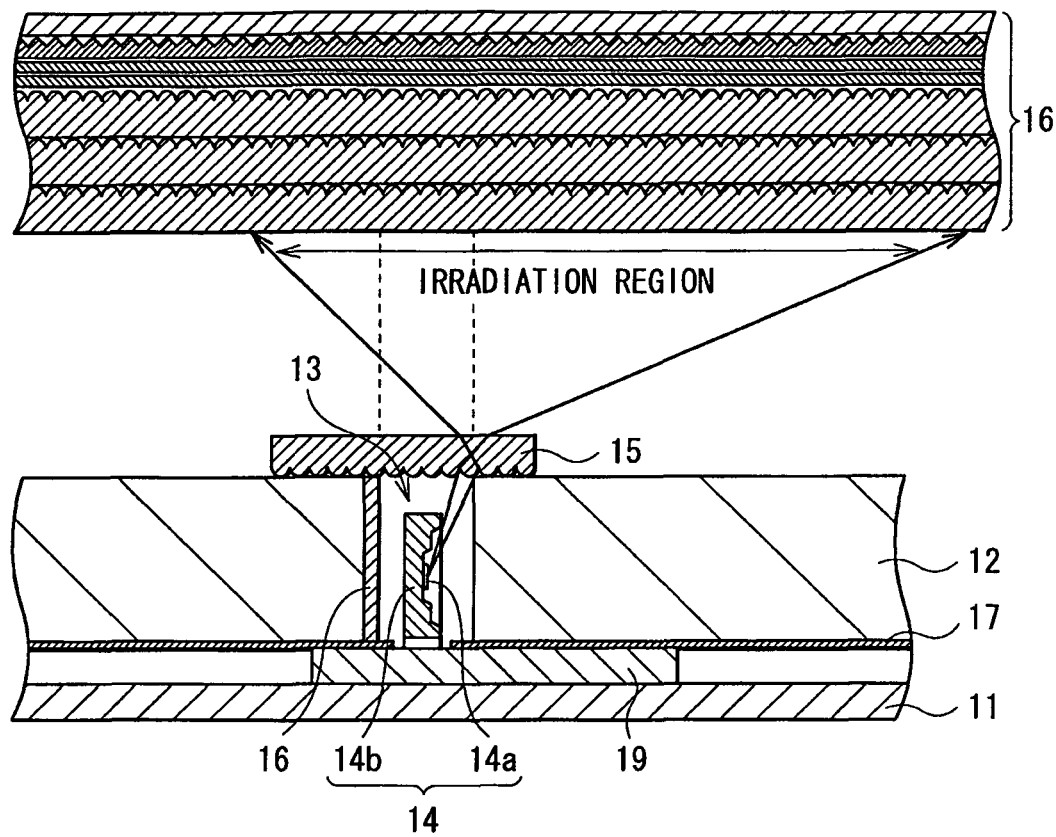
FIG. 4 is a cross section for explaining proper conditions for a light control member.

The light emitting device 10 is obtained by, as illustrated in the plane configuration of FIG. 2, one-dimensionally arranging a plurality of (six, in this case) light guide plates 12 on the same plane in a casing 11. The light guide plates 12 configures a light guide section of an embodiment of the present invention. Between the adjacent light guide plates 12, a gap 13 having a predetermined width is provided. In each gap 13, one or more (for example, 20 in this case) LED packages 14 are disposed as a light source. The LED package 14 is obtained by mounting an LED (Light Emitting Diode) 14a in a package 14b as shown in FIG. 4 and emits light from the LED 14a toward a side end face 12b of a light guide plate 12, which is opposed.

In the embodiment, on the LED package 14, a light control member 15 is provided so as to cover the neighboring light guide plates 12, that is, the gap 13. A diffusion member (diffusion sheet) 16 is provided over the light control member 15. Over the diffusion member 16, the display panel 20 (FIG. 1) is disposed.

A concrete configuration of each of the components of the light emitting device 10 will be described below.

The light guide plate 12 is an optical member having a flat plate shape for making light propagate and guiding the light to a light outgoing face (light emission face) 12a as the surface, and a side end face 12b is an incidence face (light incidence face) of light from the LED 14a. The material of the light guide plate 12 is, for example, a transparent member such as polycarbonate or acrylic. A diffuse reflection pattern for promoting light emission is provided for the upper or lower face of the light guide plate 12. The diffuse reflection pattern is formed by, for example, silk screen printing or a prism shape. The planar shape of each light guide plate 12 is, for example, a rectangular shape. A reflection sheet 17 for diffusion reflection is provided for the under face of each light guide plate 12. A reflection tape 18 is adhered to the side end face of the light guide plate 12 on the back side of the LED package 14. Each light guide plate 12 guides light entering from the side end face 12*b* by turn-on of the LED 14*a* to the top face (light outgoing face 12*a*).

The LED 14*a* is, for example, a light emission diode chip which emits blue light, and the package 14*b* is made of, for example, heat-resisting polymer, ceramics, or the like. The blue light emitted from the LED 14*a* is combined with yellow light which is emitted when a phosphor existing in the periphery of the chip is excited by the blue light to become white light. The LED package 14 is disposed perpendicularly so that the LED 14*a* faces the side end face 12*b* of the light guide plate 12. Distance "d" between the LED 14*a* and the side end face 12*b* of the light guide plate 12 lies, for example, although not limited, in the range of 0.5 mm to 1.3 mm both inclusive.

The LED package 14 is mounted on a circuit board 19 such as a flexible printed circuit (FPC), and the on/off state is switched under control of a not-shown drive circuit unit. The case where 20 LED packages 14 are provided for one side face of the light guide plate 12 is described here. The number of LED packages 14, the disposition intervals, and the like are not limited but may be properly set according to a light amount needed, the size of the light guide plate 12, and the like.

As shown in FIG. 4, the light control member 15 is a transparent plate having a light dispersion structure 15A. The back face (the side opposed to the gap 13) serves as a light incidence face 15*a*, and the surface (the side opposed to the diffusion member 16) serves as a light outgoing face 15*b*. The light control member 15 has a rectangular shape in plan view and its longitudinal direction is along the gap 13. The light control member 15 is disposed on neighboring two light guide plates 12 and 12 so as to cover the gap 13. The planar shape of the light control member 15 is not limited to a rectangular shape but may be partially deformed as will be described later (refer to FIGS. 11A and 11B). A diffusing agent may be included in the light control member 15. By balancing the lens effect of the transparent plate and the diffusion effect of the diffusing agent, a more excellent light dispersion effect is obtained.

In the embodiment, by the light dispersion structure 15A, light (leak light) from the LED 14*a*, which is leaked from the gap 13, is dispersed from the light control member 15 to a region wider than a region G (FIG. 4) opposed to the gap 13 in the diffusion member 16. It suppresses local increase in luminance caused by the leak light (occurrence of emission line).

The light disperse structure 15A may be provided for either the top face or the back face of the light control member 15. An example of providing the light disperse structure 15A on the back side will be described here. As illustrated in the enlarged view of FIG. 5, the light disperse structure 15A has a plurality of grooves 15*a*. In the diagram, the arrow A expresses the light travel direction in the light guide plate 12. The groove 15*a* extends in a direction along the side end face 12*b* of the light guide plate 12 and has two curved wall faces 15*a*2 expanding while being curved toward the inside of the groove 15*a* using a linear bottom 15*a*1 as a center. Between the neighboring grooves 15*a* and 15*a*, a projection 15*b* whose cross section has a lenticular shape is provided. The lenticular shape includes a circular shape and a noncircular shape such as a semielliptical shape. The shape of the projection 15*b* may be deformed more or less as long as a substantial curved wall face 15*a*2 is formed in the groove 15*a*. For example, the projection 15*b* may have a shape having recesses 15*b*1 and 15*b*1 near the tip of the projection 15*b* as illustrated in FIG. 6. The height of the projection 15*b* is, for example, 40 to 50 μm both inclusive, and the pitch is, for example, 90 to 100 μm both inclusive.

Such a light control member 15 may be made of, for example, a synthetic resin having high light transmittance. Examples of the synthetic resin include methacryl resin, acrylic resin, polycarbonate resin, and vinyl chloride resin. For molding the light control member 15, a normal molding method such as extrusion molding or injection molding is used. The light dispersion structure 15A is formed by, for example, thermally pressing a molded transparent synthetic resin plate using a mold member having a desired surface structure. By extrusion molding, injection molding, or the like, the light dispersion structure 15A may be formed simultaneously with molding of the light control member 15.

In the light emitting device 10 of the embodiment, to suppress local increase in luminance caused by leakage light, the light dispersion structure 15A of the light control member 15 satisfies, preferably, the following condition (a) and, more preferably, the conditions (b) and (c).

Figure 5:
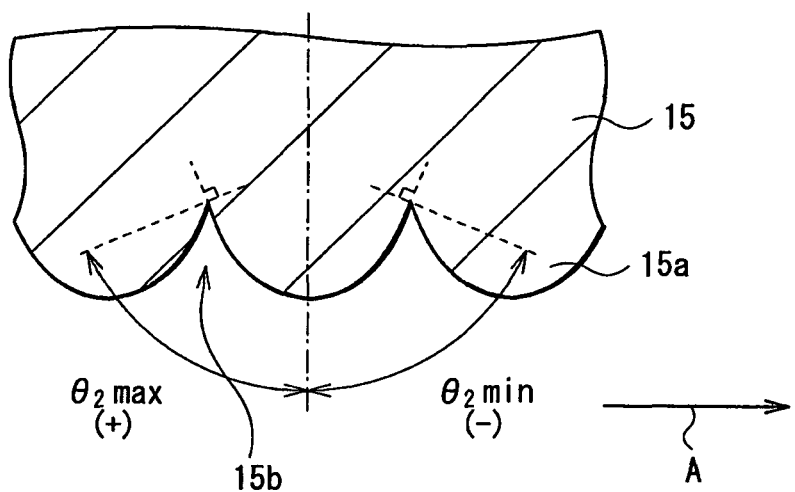
FIG. 5 is a cross section for explaining a light dispersion structure of the light control member.
Figure 6:
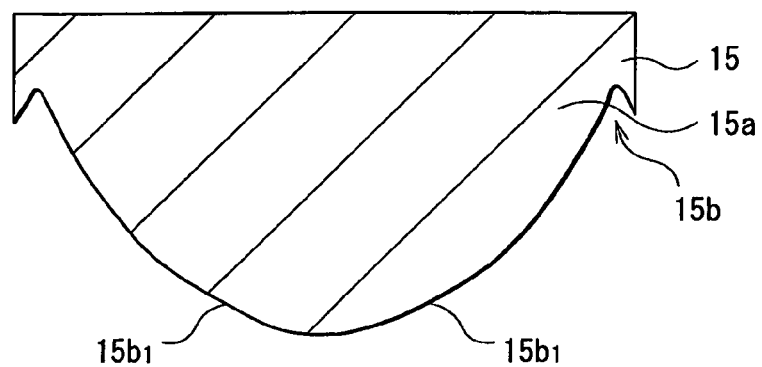
FIG. 6 is a diagram for explaining another example of the light dispersion structure.
Figure 7:
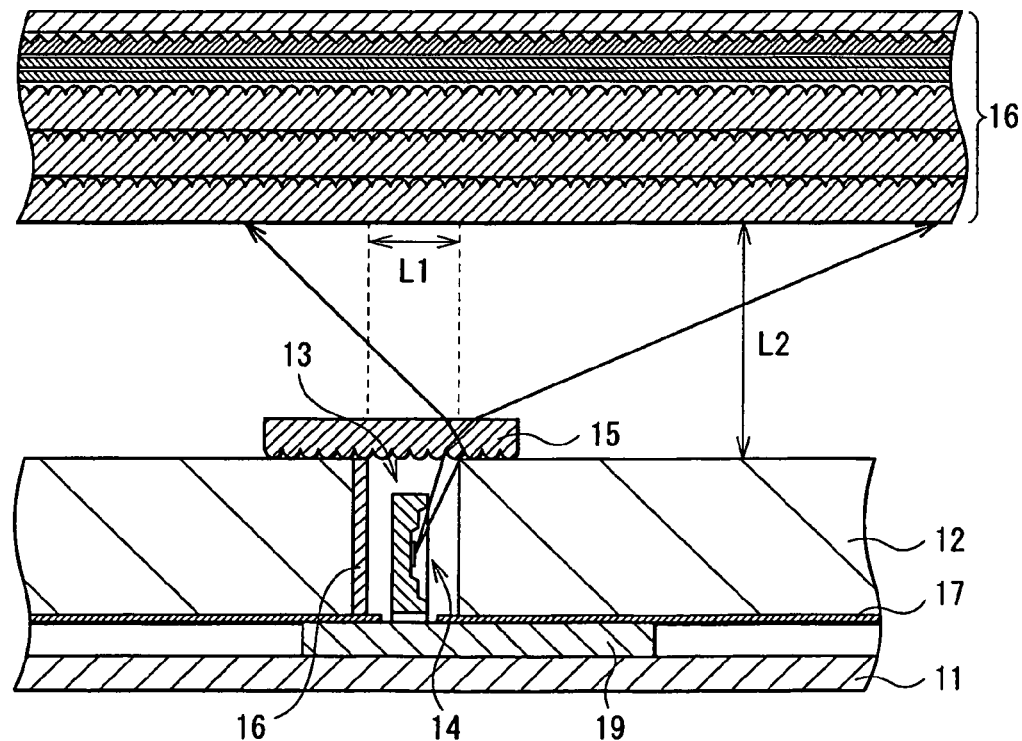
FIG. 7 is a diagram for explaining proper conditions for the light control member.
Figure 8:
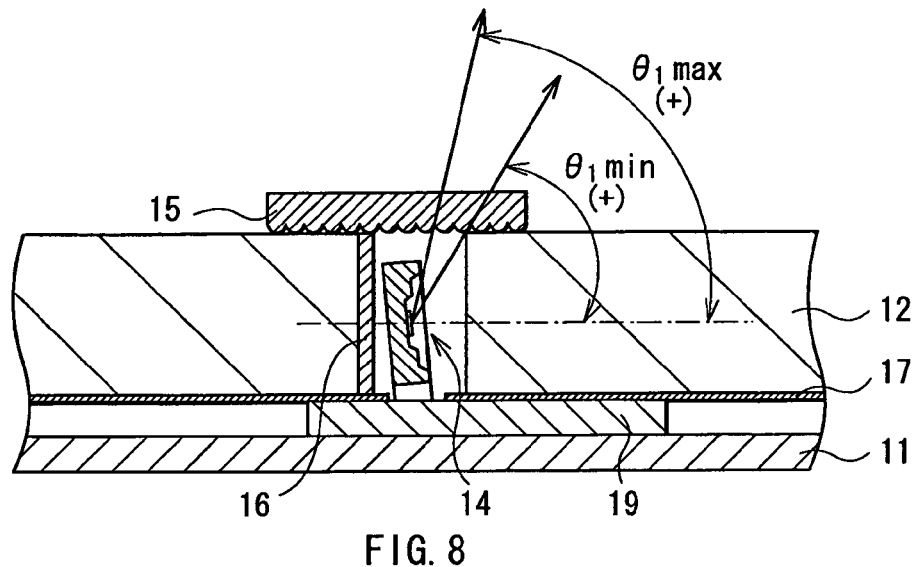
FIG. 8 is a diagram for similarly explaining proper conditions.

(a) In the case where an angle formed between light emitted from the LED 14*a* and leaked directly from the gap 13 and a normal line to the side end face 12*b* of the light guide plate is set as θ1, a wall face tilt angle θ2 of the groove 15*a* satisfies formulae (1) and (2) (refer to FIGS. 5 and 7).

In this case, a maximum value of the angle formed by the light emitted from the LED 14*a* and leaked directly from the gap 13 and the normal line to the side end face 12*b* of the light guide plate 12 is set as θ1max, a minimum value of the angle formed by the light emitted from the LED 14*a* and leaked directly from the gap 13 and the normal line to the side end face 12*b* of the light guide plate 12 is set as θ1min, a maximum tilt angle of the wall face of the groove 15*a* (a tilt of an inclined face on the side opposite to the light travel direction is set to a positive value) is set as θ2max, a minimum tilt angle of the wall face of the groove 15*a* (a tilt of an inclined face in the light travel direction is set to a negative value) is set as θ2min, refractive index of the light control member 15 is set as n1, width of the gap 13 is set as L1, and a gap between the light guide plate 12 and the diffusion member 16 is set as L2.

By satisfying the formula (1), one end (the right-side end in FIG. 4) of the irradiation region in the incidence face of the diffusion member 16, of light emitted from the light control member 15 is specified. That is, leakage light is dispersed wider to the outside from the right end of the gap 13 and, further, dispersed wider to the outside from the right end of the light control member 15. By satisfying the formula (2), the leakage light is dispersed just above the gap 13 and wider to the outside from the left end of the gap 13. Consequently, a dark part around the gap 13 is illuminated.

$$\theta 2max > \tan^{-1}\{\cos\theta 1max/(\sin\theta 1max - n1)\} \quad (1)$$

$$\theta 2min < \tan^{-1}\{(\sin\alpha - \cos\theta 1min/n1)/(\cos\alpha - \sin\theta 1min/n1)\} \quad (2)$$

$$\alpha = \sin^{-1}[-\sin\{\tan^{-1}(L1/L2)\}/n1]$$

Figure 9:
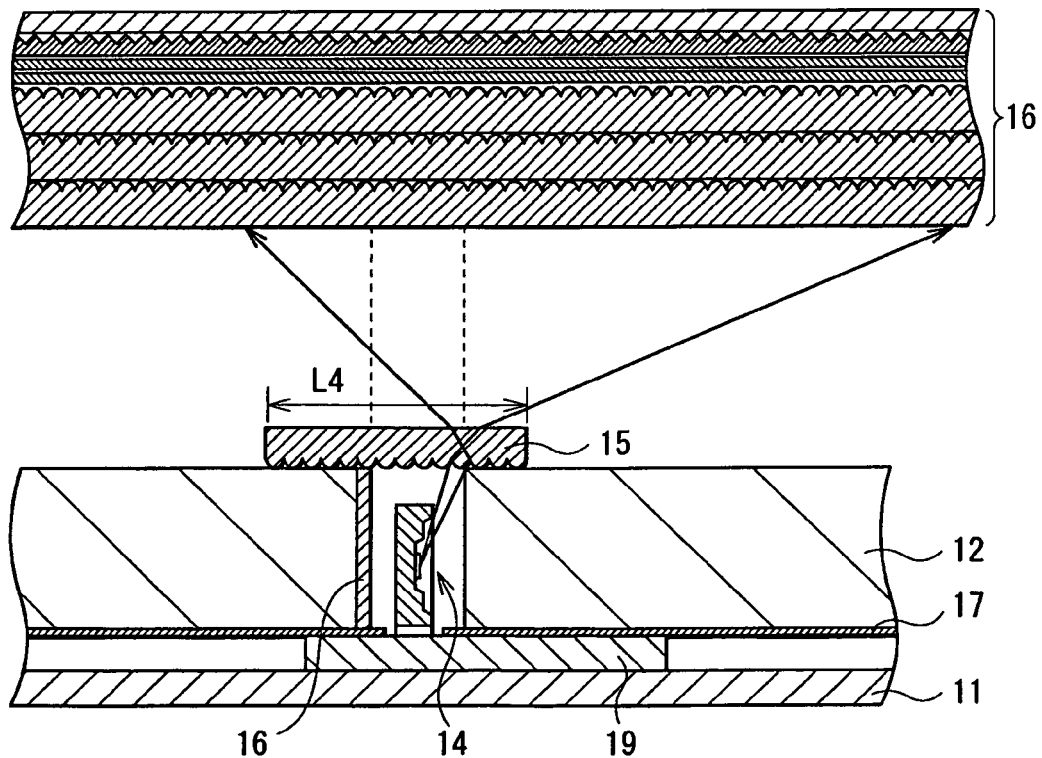
FIG. 9 is a diagram for similarly explaining proper conditions.

(b) The width L4 of the light control member 15 satisfies formula (3) (refer to FIGS. 7 and 9), where width of a gap between the light guide plates 12 and 12 is set as L1, distance between the light guide plate 12 and the diffusion member 16 is set as L2, and an irradiation range of the light control member 15 is set as L3.

By satisfying the condition, the width of the light control member 15 is set to a proper value so that surface emission light from the light outgoing face 12a of the light guide plate 12 is not influenced.

$$L3 > L4 > L1 \quad (3)$$

$$L3 = L2 \cdot \tan\{\sin^{-1}(n1 \cdot \sin\theta a)\} - L2 \cdot \tan\{\sin^{-1}(n1 \cdot \sin\theta b)\}$$

$$\theta a = -\theta 2\min - \sin^{-1}\{\cos(\theta 2\min + \theta 1\min)/n1\}$$

$$\theta b = -\theta 2\max - \sin^{-1}\{\cos(\theta 2\max + \theta 1\max)/n1\}$$

Figure 10:
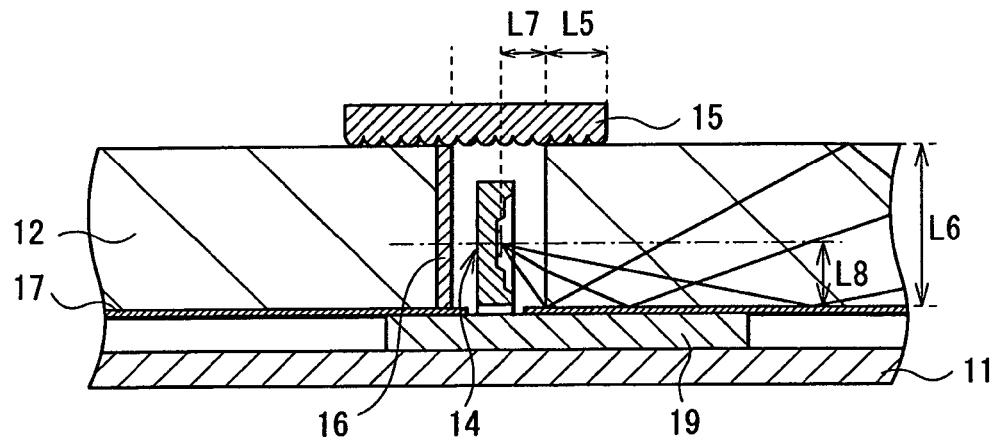
FIG. 10 is a diagram for similarly explaining proper conditions.

(c) Width L5 of a part in the light control member 15, which overlies the light guide plate 12 on the light incidence side satisfies formula (4) (refer to FIG. 10), where refractive index of the light guide plate 12 is set as n2, thickness is set as L6, distance between the LED 14a and the light incidence face (the side end face 12b) of the light guide plate 12 is set as L7, and distance between center of the LED 14a and a bottom face (reflection sheet 17) of the light guide plate 12 is set as L8. By satisfying the condition, the width L5 of the overlying part in the light control member 15 is set to a proper value so that the surface emission light from the light outgoing face 12a of the light guide plate 12 is not influenced.

$$L5 < L6/\tan[\sin^{-1}[\sin\{\tan^{-1}(L8/L7)\}/n2]] \quad (4)$$

The diffusion member 16 disposed over the light control member 15 is, concretely, a diffusion plate or a diffusion film which adjusts the in-plane luminance distribution or a radiation angle of light emitted from the light guide plate 12 to form illumination light as back light to the display panel 20.

Figures 11A, 11B:
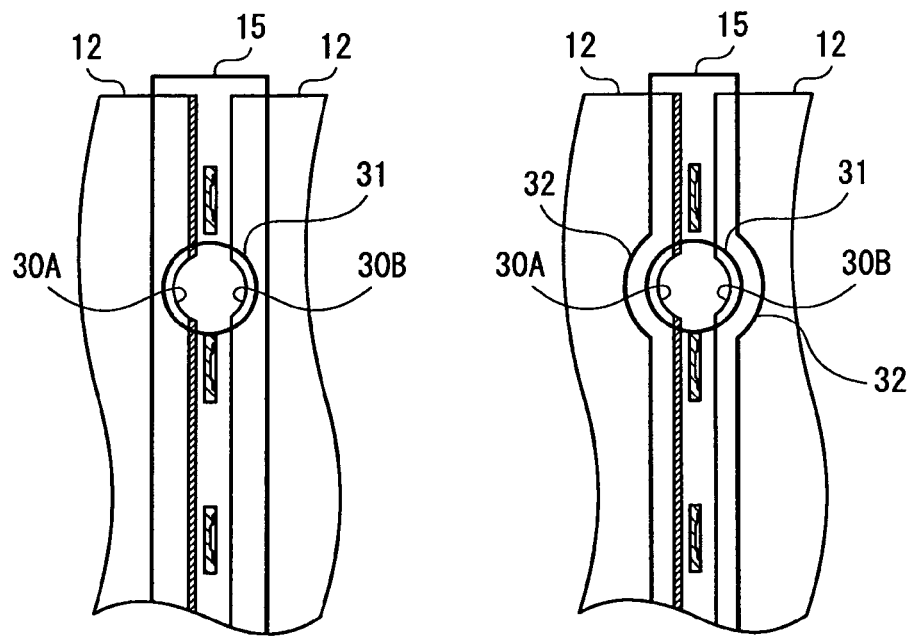
FIGS. 11A and 11B are diagrams for explaining a structure of adherence of the light control member to light guide plates.

FIGS. 11A and 11B illustrate a structure of adhesion to the light guide plates 12 of the light control member 15. Circular-shaped notches 30A and 30B are provided at a proper interval in opposed faces of the light guide plates 12 and 12, and a circular fixed hole 31 is provided in the light control member 15 so as to face the notches 30A and 30B. The light control member 15 is closely adhered to the light guide plates 12 by fastening means such as screws (not shown) through the fixed hole 31 and the notches 30A and 30B, thereby enabling stable light control to be performed (FIG. 11A). The light control member 15 may be provided with widened parts 32 on both sides of the fixed hole 31 (FIG. 11B). Although it is ideal that the light control member 15 and the light guide plate 12 are closely attached to each other, they may be apart from each other.

Figure 12:
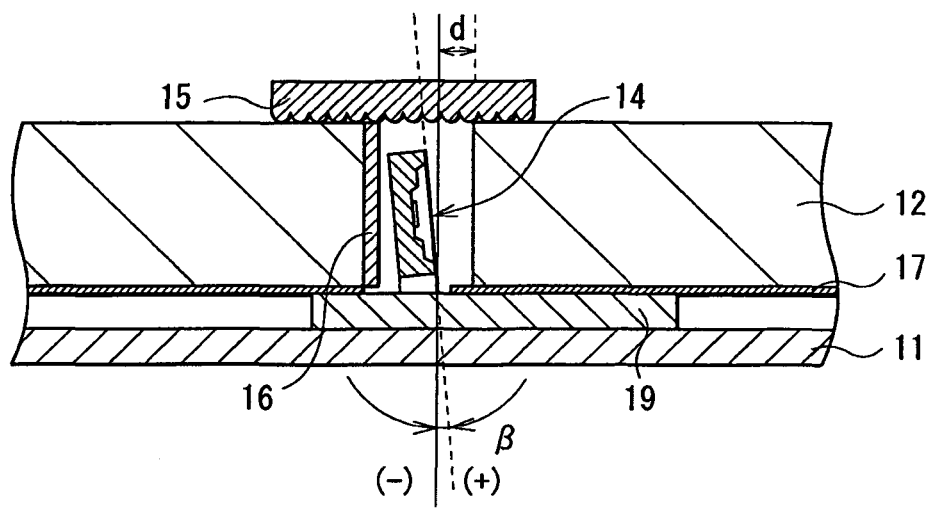
FIG. 12 is a diagram illustrating an LED tilt disposition structure.

In the foregoing embodiment, the LED package 14 is disposed perpendicular so that the LED 14a is disposed opposed to the side end face 12b of the light guide plate 12. The LED package 14 may be disposed so as to be tilted only by a predetermined angle β with respect to the side end face 12b of the light guide plate 12 as illustrated in FIG. 12. When the counterclockwise direction using the normal line on the surface of the circuit board 19 as a reference is set as "+" and the clockwise direction is "−", the tilt angle β lies, for example, in the range of—nine degrees to three degrees both inclusive. In this range, the amount of light which is directly leaked becomes optimum for luminance non-uniformity, so that occurrence of luminance unevenness is suppressed.

Operation and Effect of Light Emitting Device

Next, the operation and effect of the light emitting device 10 having the above-described structure will be described. In the light emitting device 10, light emitted from the LED 14a and entering the inside of the light guide plate 12 is emitted from the top face (light outgoing face) of the light guide plate 12 to the diffusion member 16 while propagating the light guide plate 12 by repetitive reflection and is taken as illumination light, thereby performing surface emission.

On the other hand, light leaked directly from the gap 13 (leakage light) without entering the light guide plate 12 from the LED 14a occurs. As described above, by such leakage light, the luminance distribution becomes non-uniform.

Example 1 of the light emitting device 10 of the embodiment and comparative examples 1 to 4 will now be described. In the comparative examples 1 to 4, the same reference numerals are designated to components common to those in the embodiment.

Figure 13:
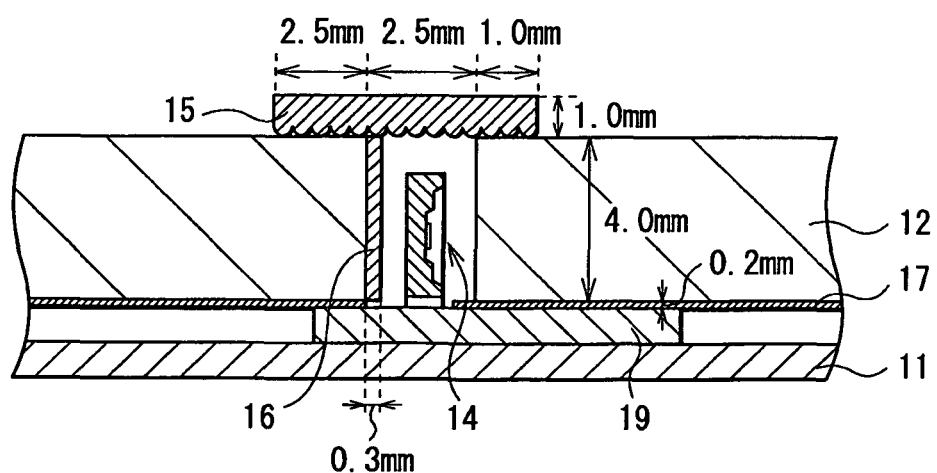
FIG. 13 is a diagram for explaining the structure of a light emitting device according to example 1.
Figure 14:
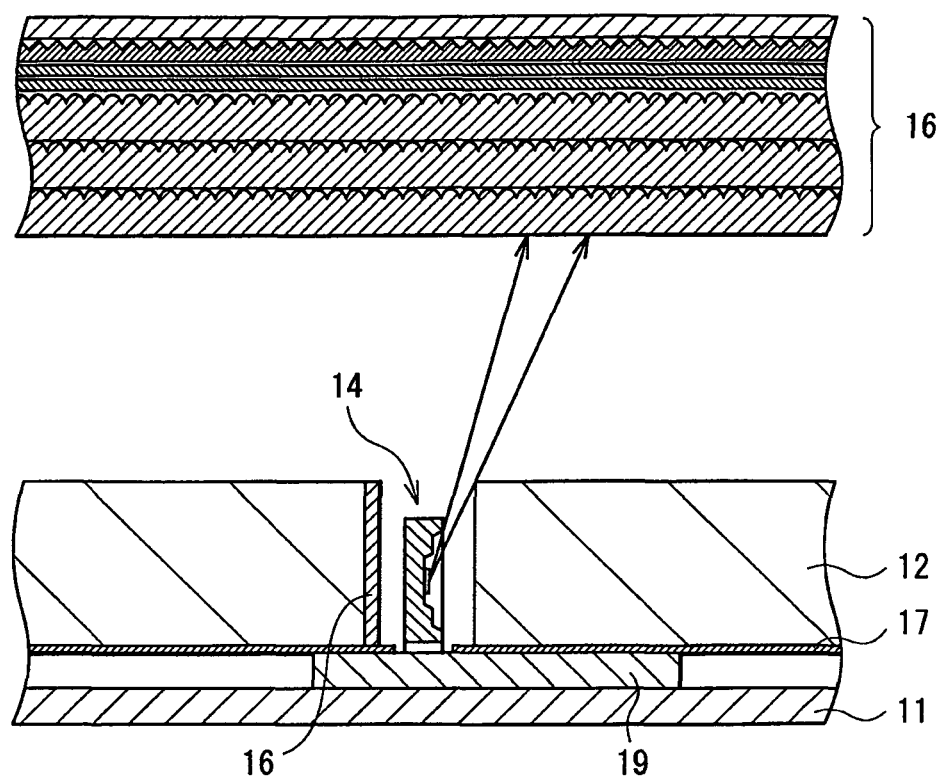
FIG. 14 is a diagram illustrating a light emitting device according to comparative example 1.
Figure 15:
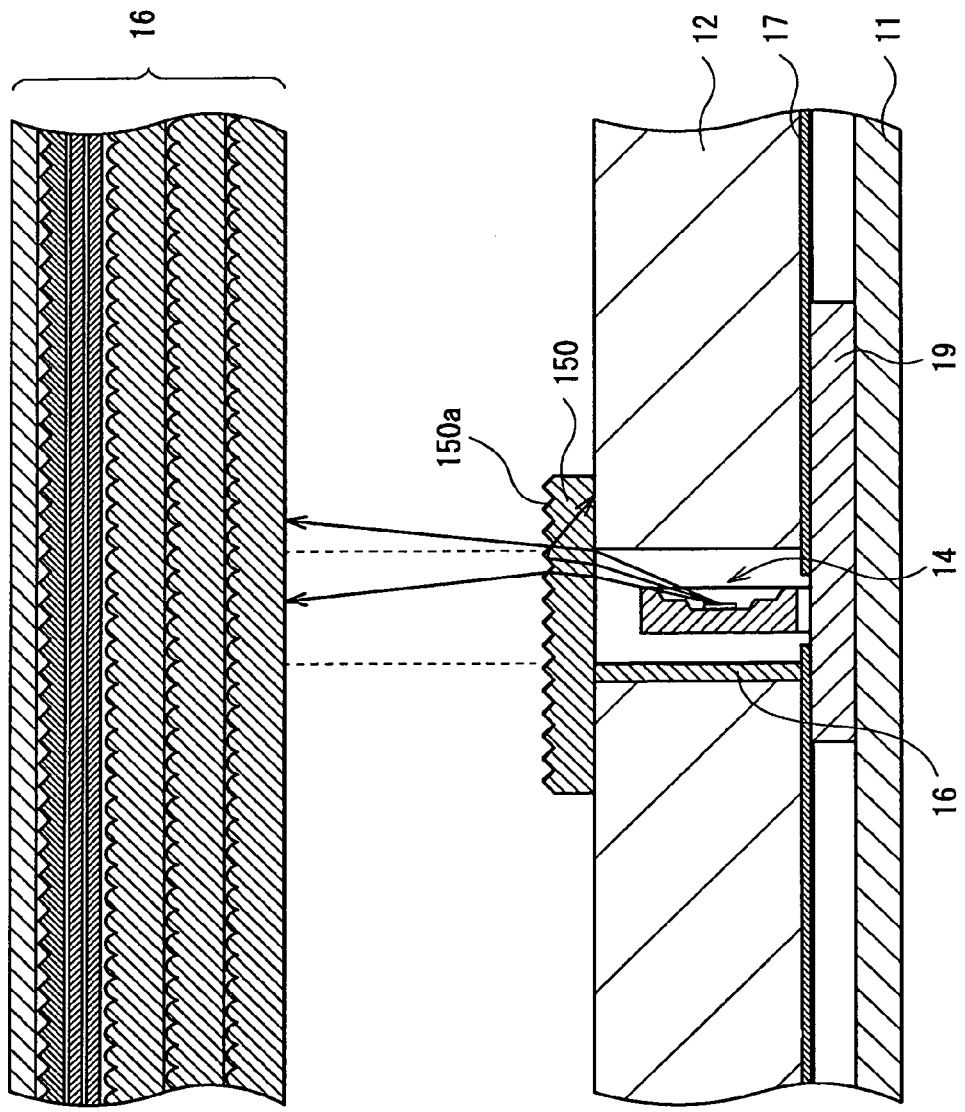
FIG. 15 is a diagram illustrating a light emitting device according to comparative example 2.
Figure 16:
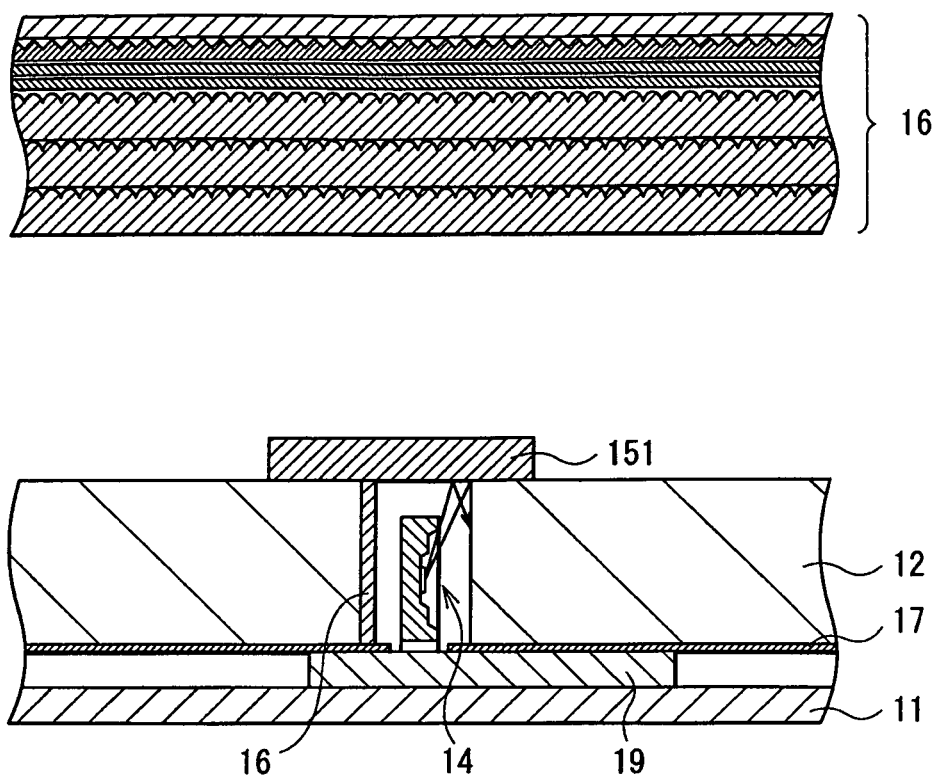
FIG. 16 is a diagram illustrating a light emitting device according to comparative example 3.
Figure 17:
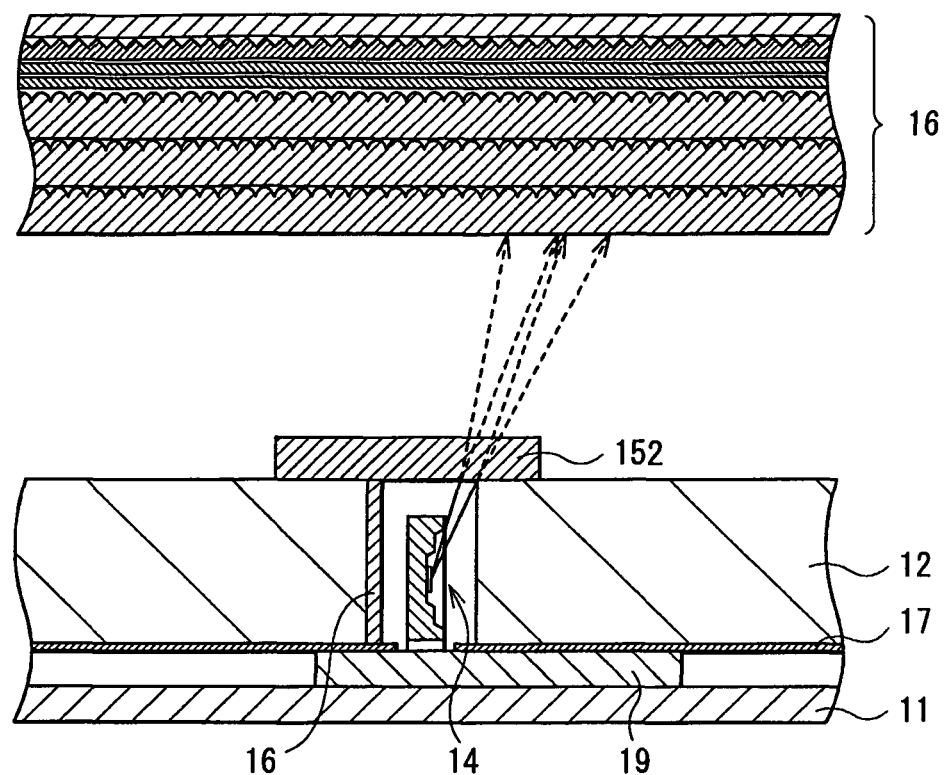
FIG. 17 is a diagram illustrating a light emitting device according to comparative example 4.

In the example 1, the thickness and length of the light control member 15, the width of the gap 13, the thickness of the light guide plate 12, the thicknesses of the reflection sheet 17 and the reflection tape 19, and the like were set to the same values as those in FIG. 13. They satisfy the above-described conditions (a) to (c). The projection 15b of the light control member 15 was formed in the sectional shape illustrated in FIG. 5, the height of the projection 15b was set to 46 μm, and the pitch was set to 96 μm. The comparative example 1 (FIG. 14) was provided with a configuration similar to that of the embodiment except that the light control member 15 is not provided on the gap 13 between the light guide plates 12 and 12. In the comparative example 2 (FIG. 15), a light control member 150 was provided on the gap 13. In the top face (the face opposed to the diffusion member 16) of the light control member 150, V-shaped grooves 150a extending in a direction along the side end face of the light guide plate 12 are provided. That is, in the comparative example 2, the shape and position of the groove are different from those of the example 1. In the comparative example 3 (FIG. 16), a reflective light control member 151 was provided on the gap 13 between the light guide plates 12 and 12. In the comparative example 4 (FIG. 17), a light control member 152 containing a scattering agent was provided on the gap 13.

Figure 18:
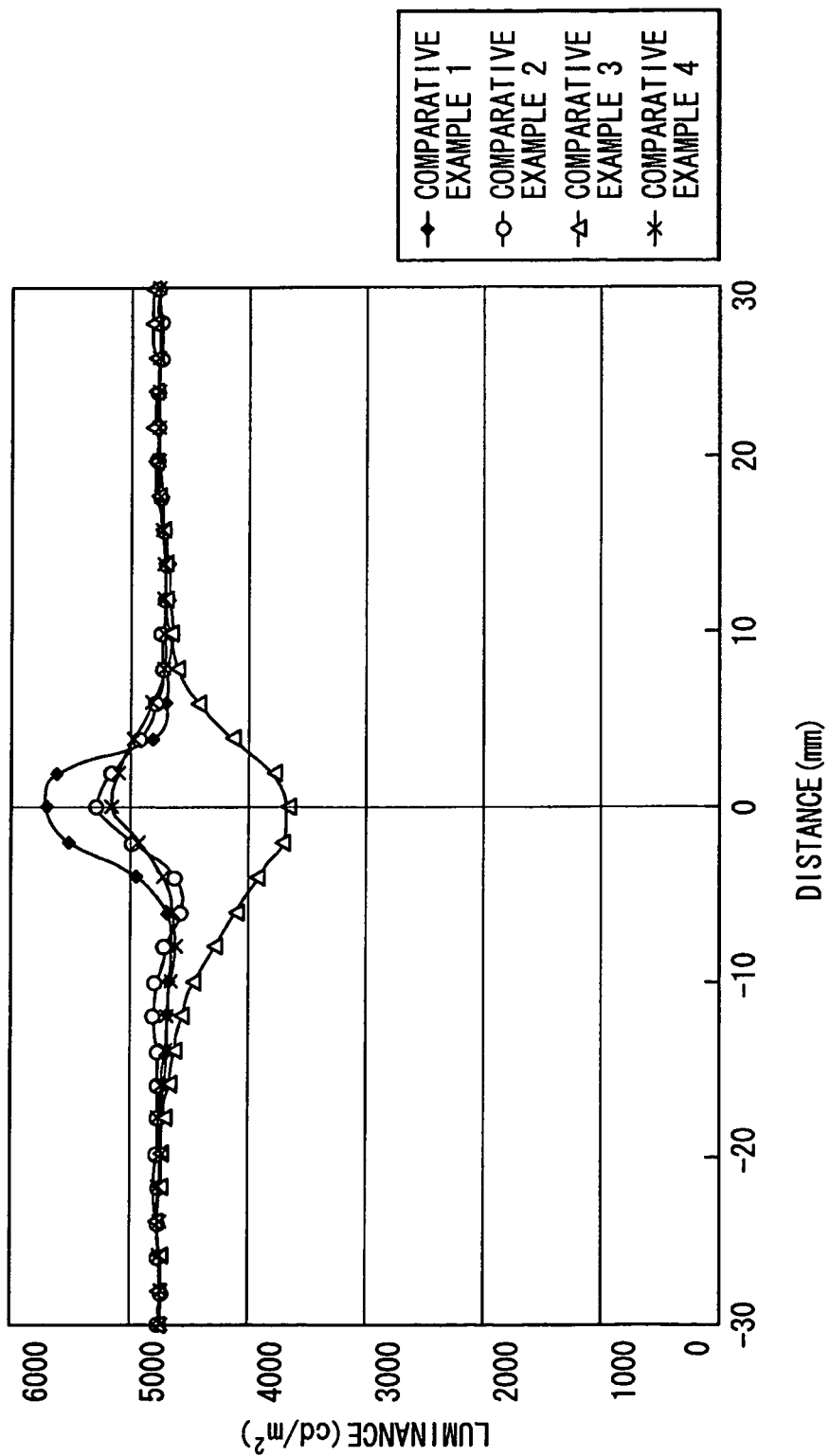
FIG. 18 is a diagram illustrating luminance distribution around the border in light guide plates in the example and the comparative examples 1 to 4.

FIG. 18 illustrates luminance distributions around the border between the light guide plates 12 and 12 in the example 1 and the comparative examples 1 to 4. In the comparative example 1, since linear light is leaked directly from the gap 13, the luminance peak is high. In the comparative example 2, although the direction of leakage light is changed by refraction, the peak remains high. In the comparative example 3, most of light is blocked, so that a dark region occurs. In the comparative example 4, although the peak becomes lower by the diffusion effect, uniformity is insufficient.

In contrast, in the example 1, the light control member 15 satisfies the conditions (a) to (c). By the light dispersion effect of the grooves 15a having the curved wall faces, the peak is largely lowered, and an almost uniform luminance distribution is obtained. That is, leakage light from the gap 13 passes through the light control member 15, thereby being dispersed larger than the width of the gap 13 and, further, the width of the light control member 15. As a result, illumination light having a uniform luminance distribution is emitted from the diffusion member 16. Therefore, white light having no luminance unevenness is obtained as entire illumination light.

As described above, in the embodiment, the plurality of light guide plates 12 are disposed on the same face, the LED package 14 is disposed in the gap 13 between the neighboring light guide plates 12, and the light control member 15 having the light dispersion structure 15A is provided above the LED package 14. Consequently, white light having a uniform luminance distribution is emitted. Therefore, by using the plurality of light guide plates 12, surface emission is performed and occurrence of luminance unevenness is suppressed. Thus, particularly, a back light suitable to a large display device and a display device using a partial driving method is realized.

In other words, in the display device 1 (FIG. 1) having such a light emitting device 10, by turning on the LED package 14 under control of the drive circuit unit in the light emitting device 10 and modulating illumination light from the light emitting device 10 on the basis of an image signal in the display panel 20, an image is displayed. In the display device 1, luminance unevenness of the illumination light emitted from the light emitting device 10 is suppressed, so that an excellent display picture quality is obtained. By arranging a number of light guide plates 12, the display device 1 is also adapted to a large liquid crystal display. Drive control (partial drive control) for turning on/off light by regions divided by the plurality of light guide plates 12 may be also performed in the light emitting device 10.

Although the present invention has been described above by the embodiment and the examples, the invention is not limited to the embodiment and the like but may be variously modified. For example, in the preferred embodiment and the like, the components of the light control member 15 satisfy the conditions (a) to (c). However, when at least the structure (the light dispersion structure 15A) in which the plurality of grooves 15a have the curved wall faces is provided, a leakage light dispersing effect is obtained.

Further, in the foregoing embodiment and the like, the case where the light guide plate has a flat plate shape, and its planar shape is rectangular has been described as an example. The invention is not limited to the shape. The planar shape may be a square, a wedge shape, or the like.

In addition, in the foregoing embodiment and the like, the configuration in which the light guide plates are disposed one-dimensionally has been described as an example. The arrangement of the light guide plates is not limited to the above. As long as the light guide plates are disposed on the same face, for example, a plurality of light guide plates may be arranged two-dimensionally in row and column directions.

The disposition position of the LED 14a is not limited to the position opposed to one side face of the light guide plate but may be a position opposed to two or three side faces. By setting the number of light control members accordingly, effects equivalent to the above are obtained.

It should be understood by those skilled in the art that various modifications, combinations, sub-combinations and alterations may occur depending on design conditions and other factors insofar as they are within the scope of the appended claims or the equivalents thereof.

What is claimed is:

1. A light emitting device comprising:
a light guide unit in which a plurality of light guide plates each having a light outgoing face on a surface and a light incidence face on a side end face are disposed on the same face so as to have gaps between the side end faces;
a light source in which one or more light emitting elements which emit light toward the light incidence face of the light guide plate is/are disposed in each of the gaps;
a light control member having a light incidence face on a back face, a light outgoing face on a surface and a light dispersion structure, and disposed so as to cover the gap on the neighboring two light guide plates; and
a diffusion member disposed above the light guide unit and the light control member,
wherein the light dispersion structure includes a plurality of grooves extending in a direction along the side end face of the light guide plate and having curved wall faces, and emits leakage light from the gap in outgoing light of the light emitting element to a region wider than a region opposed to the gap, in the diffusion member.

2. The light emitting device according to claim 1, wherein when the grooves in the light control member are formed in the light incidence face, an angle formed between light emitted from the light emitting element and leaked directly from the gap and a normal line to the side end face of the light guide plate is set as $\theta 1$, a maximum value of the angle formed by the light emitted from the light emitting element and leaked directly from the gap and the normal line to the side end face of the light guide plate is set as $\theta 1max$, a minimum value of the angle formed by the light emitted from the light emitting element and leaked directly from the gap and the normal line to the side end face of the light guide plate is set as $\theta 1min$, a maximum tilt angle of the curved wall face of the groove (a tilt of an inclined face on the side opposite to the light travel direction is set to a positive value) is set as $\theta 2max$, a minimum tilt angle of the curved wall face of the groove (a tilt of an inclined face in the light travel direction is set to a negative value) is set as $\theta 2min$, refractive index of the light control member is set as $n1$, width of the gap is set as L1, and a gap between the light guide plate and the diffusion member is set as L2, a wall face tilt angle $\theta 2$ of the groove satisfies formulae (1) and (2)

$$\theta 2max > \tan-1\{\cos\theta 1max/(\sin\theta 1max - n1)\} \quad (1)$$

$$\theta 2min < \tan-1\{(\sin\alpha - \cos\theta 1min/n1)/(\cos\alpha - \sin\theta 1min/n1)\} \quad (2)$$

$$\alpha = \sin-1[-\sin\{\tan-1(L1/L2)\}/n1]$$

3. The light emitting device according to claim 1, wherein the light dispersion structure of the light control member has a projection having a lenticular shape between the neighboring grooves.

4. The light emitting device according to claim 1, wherein the light emitting element is a white light emitting diode (LED) housed in a package.

5. The light emitting device according to claim 1, wherein the light emitting element is disposed so as to be opposed to a side end face of one of the neighboring two light guide plates.

6. The light emitting device according to claim 1, wherein the light emitting element is disposed so as to be tilted at a predetermined angle with respect to the side end face of one of the neighboring two light guide plates.

7. The light emitting device according to claim 2, wherein when width of a gap between the light guide plates is L1, distance between the light guide plate and the diffusion plate is L2, and an irradiation range of the light control member is L3, width L4 of the light control member satisfies formula (3)

$$L3 > L4 > L1 \quad (3)$$

$$L3 = L2 \cdot \tan\{\sin-1(n1 \cdot \sin\theta a)\} - L2 \cdot \tan\{\sin-1(n1 \cdot \sin\theta b)\}$$

$$\theta a = -\theta 2min - \sin-1\{\cos(\theta 2min + \theta 1min)/n1\}$$

$$\theta b = -\theta 2max - \sin-1\{\cos(\theta 2max + \theta 1max)/n1\}$$

8. The light emitting device according to claim 2, wherein when refractive index of the light guide plate is set as $n2$, thickness is set as L6, distance between the light emitting element and the light incidence face of the light guide plate is set as L7, and distance between center of the light emitting element and a bottom face of the light guide plate is set as L8, width L5 of a part in the light control member, which overlies the light guide plate satisfies formula (4)

$$L5 < L6/\tan[\sin^{-1}[\sin\{\tan^{-1}(L8/L7)\}/n2]] \quad (4)$$

9. A display device comprising
   a light emitting device, and
   a display panel displaying an image by modulating light from the light emitting device on the basis of an image signal,
   wherein the light emitting device includes:
   a light guide unit in which a plurality of light guide plates each having a light outgoing face on a surface and a light incidence face on a side end face are disposed on the same face so as to have gaps between the side end faces;
   a light source in which one or more light emitting elements which emit light toward the light incidence face of the light guide plate is/are disposed in each of the gaps;
   a light control member having a light incidence face on a back face, a light outgoing face on a surface and a light dispersion structure, and disposed so as to cover the gap on the neighboring two light guide plates; and
   a diffusion member disposed above the light guide unit and the light control member,
   wherein the light dispersion structure includes a plurality of grooves extending in a direction along the side end face of the light guide plate and having curved wall faces, and emits leakage light from the gap in outgoing light of the light emitting element to a region wider than a region opposed to the gap, in the diffusion member.

10. The display device according to claim 9,
    wherein when the grooves in the light control member are formed in the light incidence face, an angle formed between light emitted from the light emitting element and leaked directly from the gap and a normal line to the side end face of the light guide plate is set as θ1, a maximum value of the angle formed by the light emitted from the light emitting element and leaked directly from the gap and the normal line to the side end face of the light guide plate is set as θ1max, a minimum value of the angle formed by the light emitted from the light emitting element and leaked directly from the gap and the normal line to the side end face of the light guide plate is set as θ1min, a maximum tilt angle of the curved wall face of the groove (a tilt of an inclined face on the side opposite to the light travel direction is set to a positive value) is set as θ2max, a minimum tilt angle of the curved wall face of the groove (a tilt of an inclined face in the light travel direction is set to a negative value) is set as θ2min, refractive index of the light control member is set as n1, width of the gap is set as L1, and a gap between the light guide plate and the diffusion member is set as L2, a wall face tilt angle θ2 of the groove satisfies formulae (5) and (6)

$$\theta 2\max > \tan^{-1}\{\cos\theta 1\max/(\sin\theta 1\max - n1)\} \quad (5)$$

$$\theta 2\min > \tan^{-1}\{(\sin\alpha - \cos\theta 1\min/n1)/(\cos\alpha - \sin\theta 1\min/n1)\} \quad (6)$$

$$\alpha = \sin^{-1}[-\sin\{\tan^{-1}(L1/L2)\}/n1]$$

11. The display device according to claim 9, wherein when refractive index of the light guide plate is set as n2, thickness is set as L6, distance between the light emitting element and the light incidence face of the light guide plate is set as L7, and distance between center of the light emitting element and a bottom face of the light guide plate is set as L8, width L5 of a part in the light control member, which overlies the light guide plate satisfies formula (8)

$$L5 < L6/\tan[\sin^{-1}[\sin\{\tan^{-1}(L8/L7)\}/n2]] \quad (8)$$

12. The display device according to claim 10, wherein when width of a gap between the light guide plates is L1, distance between the light guide plate and the diffusion plate is L2, and an irradiation range of the light control member is L3, width L4 of the light control member satisfies formula (7)

$$L3 > L4 > L1 \quad (7)$$

$$L3 = L2 \cdot \tan\{\sin^{-1}(n1 \cdot \sin\theta a)\} - L2 \cdot \tan\{\sin^{-1}(n1 \cdot \sin\theta b)\}$$

$$\theta a = -\theta 2\min - \sin^{-1}\{\cos(\theta 2\min + \theta 1\min)/n1\}$$

$$\theta b = -\theta 2\max - \sin^{-1}\{\cos(\theta 2\max + \theta 1\max)/n1\}.$$

\* \* \* \* \*